United States Patent Office.

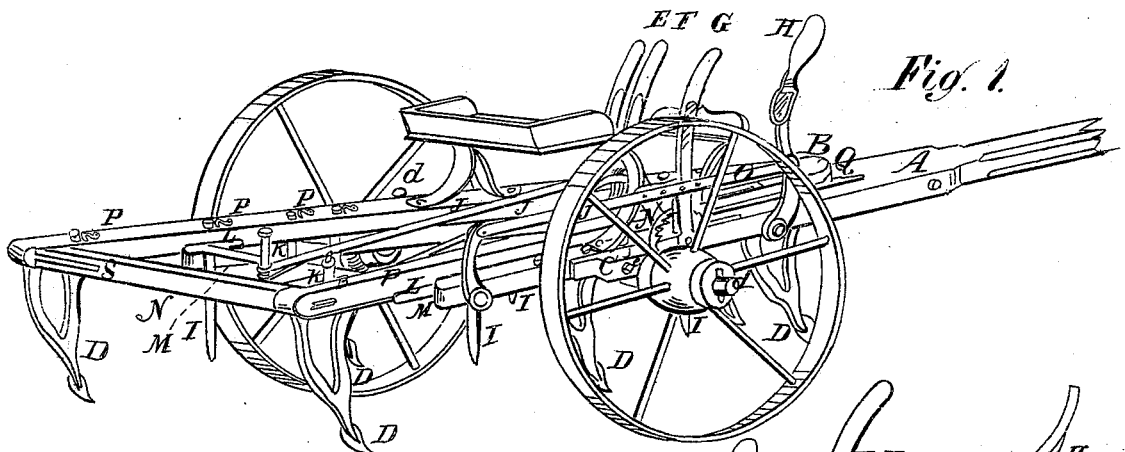
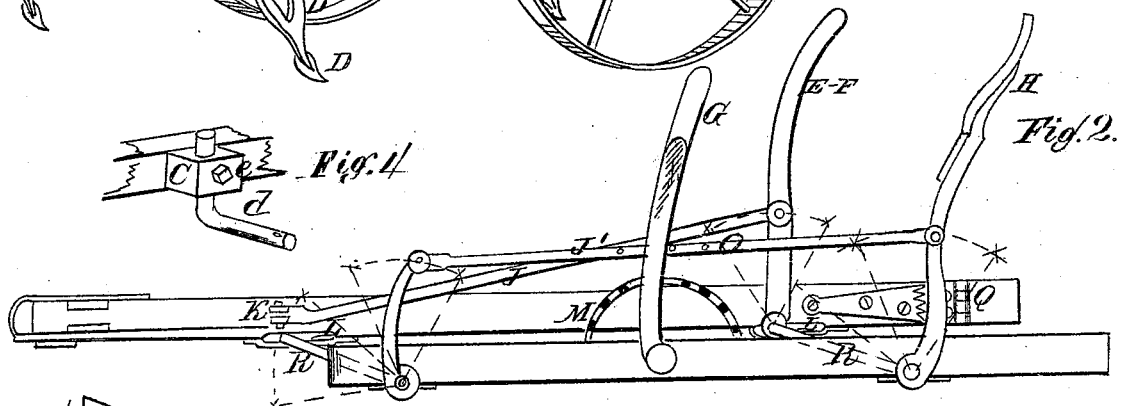
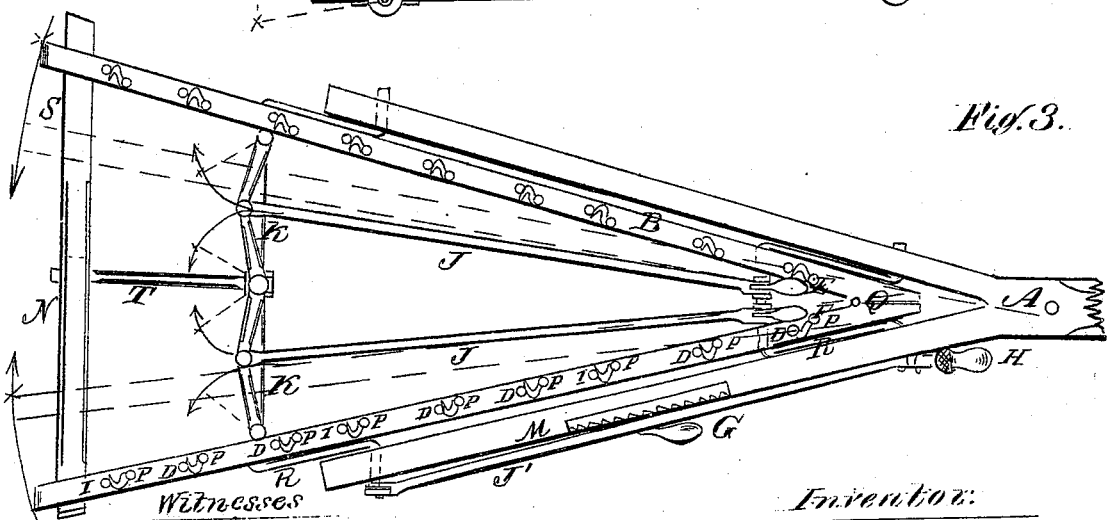

WILLIAM J. FUNK, OF PORTLAND, OREGON, ASSIGNOR TO HIMSELF AND HARRISON B. OATMAN, OF SAME PLACE.

Letters Patent No. 92,714, dated July 20, 1869.

---

IMPROVEMENT IN COMBINED HARROW AND CULTIVATOR.

---

The Schedule referred to in these Letters Patent and making part of the same.

---

Be it known that I, WILLIAM J. FUNK, of the city of Portland, in the county of Multnomah, in the State of Oregon, have invented a new and useful machine, a Harrow and Cultivator combined, and supposed to be an improvement; and the following, I do hereby declare, is a true and exact description of the construction and operation of the same, reference being had to the accompanying drawings, making a part of this specification, and figures and letters of reference marked thereon.

Figure 1 is a perspective view;
Figure 2, a side elevation;
Figure 3, a plan; and
Figure 4, a detached view of the bent axle supporting the frame of the machine.

The machine consists, generally, of two triangular frames, one within another, the outer one, A, constituting the frame, on which are secured, to either side, two "lugs" of metal, C, fig. 4, which have a hole traversing them vertically.

Into this hole a bent rod, $d$, is inserted, and fastened by a screw, $e$.

This bent rod forms one of the axles, on which the wheels of the machine are placed, they being alike on each side.

When the machine is used as a cultivator, the bent rods $d$ are inserted on the under side, as the teeth of the cultivator are longer than the teeth of the harrow, and differ in length about as much as the vertical part of the rod $d$ is long.

When the machine is used as a harrow, the cultivator-teeth are taken out, by disengaging the hook-shaped latches P, seen in the plan at fig. 3, and the bent rod $d$ is loosened and put in from the upper side of the lugs C, and fastened with the screw $e$, as before.

By this means the frame A is lowered, so that the harrow-teeth strike the ground, and are then in a position for work.

So much for the outer frame A, on which are placed the levers G and H, which raise and adjust the height of the cultivator and harrow-frame B, which is held in position by the pins in pin-holes O, in one of the rods J, operating against the lever G from the front, by reason of the weight of the harrow and cultivator-frame B.

The lever G is held in place by the semicircular cog-bar M, which is firmly fastened to the frame A.

The lever H is fastened to the axle of one of two crank-bars R, and is connected with the rear crank-bar by one of the rods J', and as it is thrust forward or backward, the frame B rises and falls.

The levers E and F operate the toggles K, which are used where rows of corn, or other products, are crooked, as is often found to be the case in corn or potato-fields.

If the driver finds such a row approaching him, and his machine likely to plow it up, he pulls one or both the levers toward him, which throws the toggles rearward, and thus narrows his machine and allows it to pass through, without injuring his crop.

This part of the machine is believed to be an improvement on any cultivator now in use.

This narrowing and widening allow the operator to do just as he pleases, without turning his team either to the right or left.

In so turning his team, he is liable to trample down his crop, at least, but by this device described, no such course is necessary.

Thus it will be seen that the machine is adjustable, up and down, right and left. For, also, the wheels, as they run over furrows or hills, do not raise the cultivators or harrows out of the ground until they meet some considerable obstacle.

The machine runs along just as a harrow of the common kind drags from a chain, to a limited extent, as the frame B is actually hung on the crank-rods R, which act as a common draught by a chain, unless the pins are in the holes O, on the rod J', thus making it rigid like other cultivators.

Neither of the crank-rods R moves laterally, but their ends are in the outer frame A.

On the rear crank-rod R, a long piece, T, swivels, having a collar on each side of it around the crank-rod, and on the end between the collars is a pin, on which the inner ends of the toggles turn.

The rear end of this piece T rests in a slot, N, on the under side of the back-piece, in the frame B.

This slot allows the right side of the frame B to traverse toward the left, without interfering with the piece T, which holds one end of the toggles K.

Another tenoned slot, S, has a similar use when the left side or end retreats toward the centre.

(It should have been said before, that the frame B is hinged at the front by a hinge, Q.)

On the under side of either the right and left piece of the frame B, are two slots L, in which the crank-rods R are placed, and admit of the movement above described, viz, from side to side.

The letters I represent the harrow-teeth, and letters D the cultivator-teeth, and it becomes a cultivator when they are in, or a harrow when they are out, subject to the changes described before.

It is believed that the foregoing parts are new and useful improvements.

What I claim, is—

1. The cultivator and harrow-frame B, as constructed, and arranged in combination with the main frame A.

2. The toggles K, in combination with crank R, levers E and F, and rods J J.

3. In combination with the cultivator and harrow-frame, cultivator and harrow-teeth, the latches P, for the purposes specified.

4. In combination, the frame B, frame A, toggles K, crank-rods R, levers E and F, rods J J, lever H, rod J', and latches P, all as constructed and arranged.

WM. J. FUNK.

Witnesses:
S. L. MASTERS,
WM. H. PAYNE.